Figure 1:
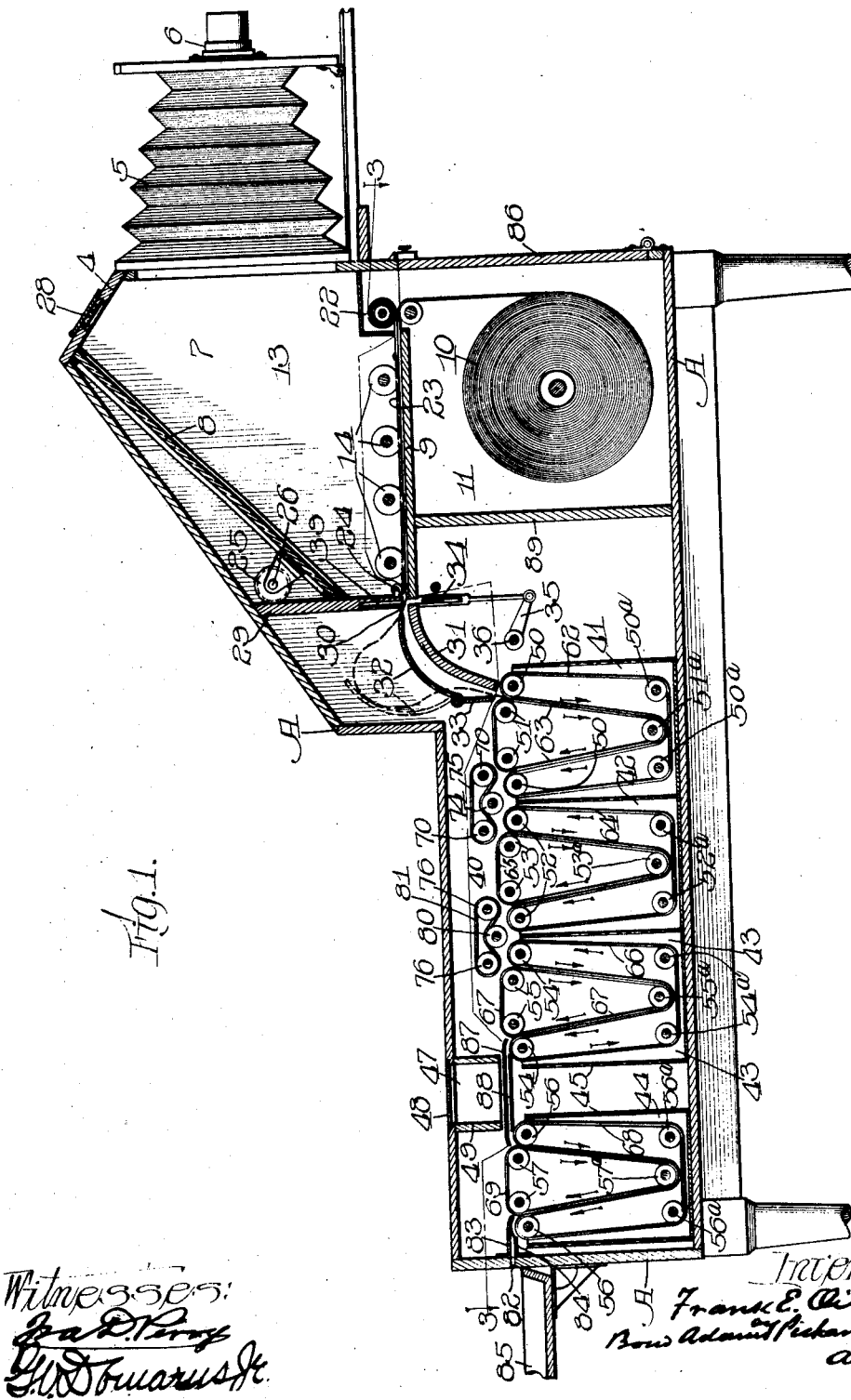

F. E. OILER.
COMBINED PHOTOGRAPHING AND DEVELOPING APPARATUS.
APPLICATION FILED MAR. 5, 1909.

983,926.

Patented Feb. 14, 1911.
2 SHEETS—SHEET 1.

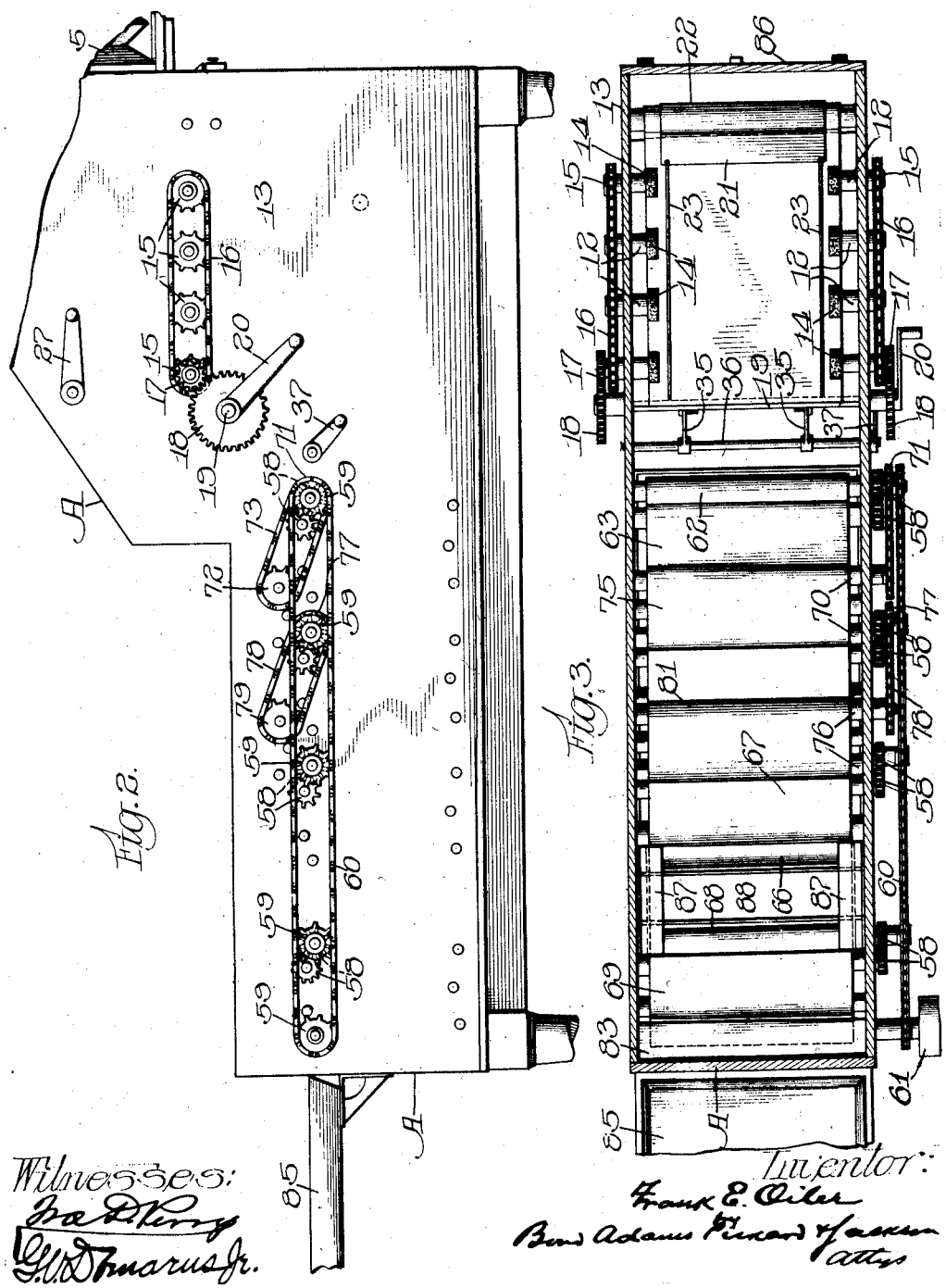

UNITED STATES PATENT OFFICE.

FRANK E. OILER, OF OMAHA, NEBRASKA, ASSIGNOR TO THE COPYOGRAPH MANUFACTURING COMPANY, OF OMAHA, NEBRASKA, A CORPORATION OF MISSOURI.

COMBINED PHOTOGRAPHING AND DEVELOPING APPARATUS.

983,926.

Specification of Letters Patent. Patented Feb. 14, 1911.

Application filed March 5, 1909. Serial No. 481,481.

*To all whom it may concern:*

Be it known that I, FRANK E. OILER, a citizen of the United States, residing at Omaha, in the county of Douglas, State of Nebraska, have invented certain new and useful Improvements in Combined Photographing and Developing Apparatus, of which the following is a specification, reference being had to the accompanying drawings.

My invention relates to photographic apparatus, and its object is to provide a new and improved combined photographic and developing mechanism by means of which positive photographs may be taken and developed directly upon sensitized paper without the use of negatives.

While my invention may be used for general photographic purposes, it is particularly adapted for the photographing of written or printed documents or of pictures and the like in such a way that a photograph of the object may be taken directly upon sensitized paper and that paper so developed that the photograph produced will be what is known as a positive print without the use of a negative in any form in the production of such positive. In the case of photographing a printed document, for example, the photograph of the document is taken upon the sensitized paper and the paper so treated and developed that the photograph taken, without the use of a negative, will show black or dark where the original was black or dark and white or light where the original was white or light. I accomplish these objects by the means illustrated in the drawings and hereinafter specifically described.

That which I believe to be new will be pointed out in the claims.

In the drawings:—Figure 1 is a vertical longitudinal section. Fig. 2 is a side elevation, partially broken away, the driving pulley being removed for clearness of illustration of other parts. Fig. 3 is a plan section, taken upon section line 3—3 of Fig. 1.

Referring to the drawings:—A indicates a casing, which, by means of suitable partitions, as 9, 29 and 89, is divided into a camera chamber 7, a roll chamber 11, and developing chamber 40.

4 indicates the camera which is provided with the usual extending bellows 5 and photographic lens apparatus 6 and with the said camera chamber 7.

8 indicates a mirror in the dark chamber 7 which is preferably set as shown at an angle of forty-five degrees to the longitudinal line of the camera.

9 indicates a partition, as stated, forming a table at the bottom of the dark chamber, across which a roll of sensitized paper is passed in the taking of a photograph.

10 indicates a roll of sensitized paper which is mounted in a dark chamber 11 below the dark chamber 7 and from which the paper is adapted to be passed upward into the dark chamber 7 with its sensitized surface upward and to lie upon the table 9 for photographing.

12 indicates stub shafts which are journaled in the sides 13 of the casing of the dark chamber 7 upon each side thereof, as is best shown in Fig. 3.

14 indicates friction pulleys or wheels which are secured upon the inner ends of the stub-shafts 12, and are adapted to bear upon the upper surface of the table 9 and engage the edges of the roll of sensitized paper so as to hold it upon the table 9 in position to receive a photographic imprint, and adapted to be driven as hereinafter described to forward the sensitized paper to the other apparatus hereinafter described.

Upon the outer ends of the stub shafts 12 are mounted sprocket wheels 15 around which passes a sprocket chain 16, one upon each side of the apparatus.

17 indicates gears secured to the outer ends of the last of the stub shafts 12 and which are adapted to mesh with and be driven by gears 18 which are secured upon the outer ends of a shaft 19 which is journaled in the side portions 13 of the casing of the apparatus and extends across the apparatus from side to side projecting at each end to receive the gears 18. The shaft 19 may be driven in any suitable manner, as by a crank 20 upon the outside at one side of the casing.

When the shaft 19 is rotated in the proper direction, the sprocket-wheels and stub-shafts 12 will be correspondingly rotated through the operation of the gearing and sprocket-chain, and, rotating the pulleys 14, will advance the sensitized paper from the roll out of the dark chamber 7, as hereinafter described. The gearing is so timed that the amount of the advance of the paper may be ascertained by the number of rotations of the shaft 19.

21 indicates an opaque curtain which is mounted upon an ordinary spring roller 22 at the bottom of the dark chamber 7, and at one end of the table 9 above the passage between the roll chamber 11 and the dark chamber 7. The spring-operated roller 22 may be of any well-known type and method of operation, serving to automatically roll up the curtain 21 when it has been pulled out to cover the sensitized paper as hereinafter described and when it is released so as to be free to return. The curtain 21 is made of any suitable opaque material, but has its upper or exposed surface of white or light color upon which the reflected image may be seen.

23 indicates bands which are attached to the forward edge of the curtain 21 upon each corner thereof and which extend across the surface of the table 9 to suitable rollers, as 24, and up to a roller 25 which is journaled upon a shaft 26 mounted in the side portions 13 of the casing and provided with an operating crank handle 27 upon its outer end. By operating the crank 27, the roll 25 is rotated, winding the cords 23 upon the roller and drawing the curtain against the action of the spring roller 22 over the table 9 so as to cover the sensitized paper below the curtain. The purpose of this curtain is two-fold,—first in order that the paper may be protected while the proper focus is obtained through the usual opening, as 28, in the camera,—and second so that it may be drawn over any desired portion of the paper to protect such portion as is covered from the action of the light in the camera. As soon as the crank 27 is released, the spring roller retracts the curtain to its original position.

It will be readily understood that by exposing the sensitized paper to the photographic action of the light in the camera that reflects upon the mirror, the paper is acted upon by the light in the usual manner to affect the chemicals, which is necessary to the subsequent developing process.

29 indicates a partition in the casing between the chambers 7 and 40, and is so constructed as to leave a narrow cross slot 30 at the bottom of the chamber 7 even with the surface of the table 9 through which the paper is forwarded to the subsequent treating and developing apparatus.

31 indicates a curved guide whose upper edge is in registry with the slot 30 and the top of the table 9 and which curves downward to direct the paper into the forwarding mechanism hereinafter described.

32 indicates a curved guide which is hinged to a suitable support, as 33, within the chamber and normally lies in the position shown in Fig. 1, and serves to direct the lead edge of the paper, when, after it has been exposed to the action of light, it is forwarded by the forwarding mechanism above described for the subsequent treating and developing process, the paper passing between the guides 31 and 32.

34 indicates a severing knife of any well-known form and description which is operated by the lever 35 on a rock-shaft 36 operated by a crank 37 on the exterior of the chamber, and, working into a slot 39, in the partition 29, operates to sever the sheet from the roll of sensitized paper, after the same has been exposed and forwarded by the forwarding mechanism.

40 indicates the treating and developing chamber in which are located a plurality of treating tanks 41, 42, 43 and 44. The last tank 44 is separated from the other tanks by an interval, and by cross partitions 45 above which is located an opening 47 covered by a glass plate 48.

49 indicates cross partitions which extend across the treating and developing chamber 40 from side to side toward the partitions 45 in such a way, in combination with the other devices hereinafter described, as to practically exclude the light which passes through the glass 48 from the other portions of the treating and developing chamber 40 upon each side thereof.

50—50$^a$, 51—51$^a$, 52—52$^a$, 53—53$^a$, 54—54$^a$, 55—55$^a$, 56—56$^a$ and 57—57$^a$ indicate rollers which are mounted upon suitable shafts journaled in the sides 13 of the casing of the apparatus. These rollers are driven by gearing 58, sprocket-wheels 59 and a sprocket-chain 60 which, in turn, are driven in any suitable manner, as by a pulley 61 on one of the shafts on the exterior of the machine and operated either by hand or by power in any suitable manner. The rollers 50—51, 52—53, 54—55, and 56—57 are located at the top, and the rollers 50$^a$—51$^a$, 52$^a$—53$^a$, 54$^a$—55$^a$ and 56$^a$—57$^a$ at the bottom of the tanks 41, 42, 43 and 44, respectively.

62 indicates a belt which passes around rollers 50, 50$^a$ and below the roller 51$^a$ in the tank 41.

63 indicates a belt which passes around the rollers 51—51$^a$, 64 indicates a belt which passes around the rollers 52—52ᵃ and below the roller 53ᵃ in the tank 42.

65 indicates a belt which passes around the rollers 53—53ᵃ.

66 indicates a belt which passes around rollers 54—54ᵃ and below the roller 55ᵃ.

67 indicates a belt which passes around rollers 55—55ᵃ.

68 indicates a belt which passes around rollers 56—56ᵃ and below the roller 57ᵃ.

69 indicates a belt which passes around the rollers 57—57ᵃ.

The conveyer belts are preferably of an absorbent material.

The several rollers 50—51, 52—53, 54—55, and 56—57 are so located with reference to one another that the respective belts carried thereby will have their opposing surfaces in contact so that when the paper is brought between them as hereinafter described they will forward the same.

70 indicates rollers which are journaled in the sides 13 of the casing and are driven by suitable gearing, as 71, sprocket wheels 72 and sprocket chain 73 and are located above the rollers 50—51 and 52—53. 74 indicates an idler roller located below and between the rollers 70. 75 indicates a belt which passes around the roller 70 and over the roller 74. 76 indicates another pair of rollers located between the rollers 52—53 and 54—55 and driven in any suitable manner, as by gearing 77, sprocket chain 78 and sprocket wheel 79.

81 indicates a belt which passes around the rollers 76 and over the idler roller 80.

The several belts are all driven in the directions indicated by arrows in Fig. 1.

82 indicates a discharge slot in the end of the casing and extending across the same from side to side and of just sufficient width to allow the paper to pass freely through it.

83 indicates a guide whose lower surface is in registry with the upper surface of the slot 82 and projecting inward over the roller 56 operates to engage the lead edge of the sheet forwarded by the belts 68—69, as hereinafter described, and, with the coöperation of the lower guide 84, to control the lead edge of the sheet and direct it into the slot 82 from whence it is delivered into any suitable receiving receptacle, as 85.

86 indicates a hinged door in the front of the casing, which may be opened to permit the insertion of the roll of sensitized paper.

87 indicates guides which are located at each side of the chamber 40 below the opening 47, and, curved downward at both ends, extend out over the bite of the second pair of rollers 54—55 and the first pair of rollers 56—57 in the tanks 43 and 44, respectively, and are adapted to receive the lead edge of the paper from the belts 66—67 and direct them into the bite of the belts 65 68—69.

88 indicates a guide plate which extends across the chamber from side to side below the guides 87 and above the space between the partitions 45 so as to be brought into contact at both edges with the belts on the rollers 54 and 56, respectively. The partitions 49—45 and the guide plate 88 are so arranged as to substantially exclude from the reducing chamber 40 such light as may pass through the opening 47.

In operation the tank 41 is filled with a reducing fluid of any well-known chemical composition, whose action is to chemically change and dissolve the chemicals upon the portions of the sensitized surface of the paper which have been acted upon by light in the camera and to leave unchanged the chemicals upon such portions of the sensitized surface as have not been acted upon by light in the camera. For instance, in case the prepared sensitized surface has been treated with a bromid of silver preparation, such a well-known reducing or developing fluid as metol, or hydrochinon, may be used, whose action is to reduce the bromid of silver upon such portions of the sensitized paper as have been acted upon by the light in the camera to metallic silver oxid. The second tank 42 is filled with water operating to wash from the surface of the paper such portions of the reducing or developing fluid as may have been carried along by the paper. The tank 43 is filled with any well-known fluid which will operate to dissolve and take from the paper the chemicals acted upon by the light in the camera and reduced in the tank 41. For instance, in the case of the use of paper sensitized with a bromid of silver preparation and reduced in tank 41 by such a reducing and developing material as metol or hydrochinon, the tank 43 may contain a solution such as persulfate of ammonia whose action is to dissolve and take from the paper the oxid of silver produced by passing the paper through the reducing fluid in the tank 41. The tank 44 contains any well-known developing and fixing fluid which will operate upon such portions of the sensitized surface as have not been exposed to the action of light in the camera and which have been left unaffected by the passage of the paper through the tanks 41, 42 and 43, but subsequently exposed to the action of light through the glass 48.

The operation of the mechanism is as follows:—The camera is placed in position and focused upon the article desired to be photographed, which, for the sake of clearness of illustration, we may suppose to be a page of printed matter in which the letters and figures are printed in black upon a white surface. The proper focus is obtained by drawing the opaque curtain over the sensitized surface of the paper so that the image reflected upon the curtain may be observed from the outside through the usual opening for such purpose, without affecting the sensitized paper below the curtain. The curtain being then allowed to retract to the normal position, the sensitized paper is suitably exposed by the camera. It will be obvious that such portions of the image of the thing to be photographed,—as consist in the case supposed of the black letters and figures,—will be unaffected by the action of the light, while all the rest of the surface of the paper will be affected. After exposure, the driving pulleys 12 are driven by means of the crank 20 and the paper is forwarded through the slot 30, rotating the roll 10 of course with it, and directing the lead edge between the guides 31 and 32 so that the lead edge will be directed between the bite of the belts 62—63 on the rollers 50—51. When the lead edge comes in contact with the bite of the belts, the paper will be buckled so as to lift the hinged guide 32, as shown in dotted lines in Fig. 1, and when the desired amount of paper has been so moved forward, the knife is operated to sever it. In case the mechanism which operates the belts in the treating tanks is operated continuously, which is the preferable method, the belts will be driven at a slower speed than the forwarding mechanism in the camera, so as to permit this buckling of the paper when its lead edge is seized between the first pair of belts and give the knife time to operate. The forwarding mechanism of the camera is then stopped and the severed sheet is forwarded by the belts. It is first carried down by the belts 62—63 into the treating tank 41 where it is exposed to the action of the reducing fluid above described, which chemically operates, as has been above described, to dissolve the chemicals of all such portions of the sensitized surface as have been affected by the action of light,—in other words, in the case supposed, upon all such portions of the surface upon which the white portions of the image have been projected. Being thence carried upward out of the treating tank 41, the paper is directed between the belt 75 and the idler roller 74 which operates to squeeze the paper between the roller and the belt and mostly free it from such portions of the treating fluid as have been carried up out of the tank 41. The paper is then directed between the belts 64—65 by which it is carried downward into the water tank 42 and operated upon as above described, thence out of the water tank 42 between the belts 70 and the idler roller 71, which operate to free the treated paper of the water which may have been carried up by the sheet from the tank 42. The paper is thence directed by the belt 81 between the belts 66—67 by means of which it is carried downward into the tank 43 in which it is treated as above described by the fluid therein contained. By this operation, all the chemicals with which the surface of the paper had been treated to sensitize it have been removed from such portions of the sheet as have been exposed to the action of light in the camera, leaving unaffected such portions as have not been exposed to the light. In the instance cited, as an example, such portions of the paper as have been exposed to the white portions of the image are freed of the sensitizing chemicals, while the portions that have received the black lettering have been so far unaffected by either the light in the camera or the chemicals in the tanks. The paper then carried out of the tank 43 by the belts 66—67 is directed between the guides 87—88 where it is exposed to the action of light below the opening 47 and glass 48. This immediately acts upon such portions of the chemically prepared surface as have remained up to this point unaffected,—in other words, in the instance supposed, upon such portions of the image as have consisted of the black letters and figures, and the light reacts upon these portions in the usual manner. The guides 87—88 direct the paper into the bite of the belts 68—69 by means of which it is carried through the developing and fixing fluid in the tank 44 and the image is developed in the usual manner. Carried by the belts 68—69 out of the tank 44, the paper is fed out between the guides 83—84, through the slot 82 and delivered with a positive photograph upon its surface into the receptacle 85.

In the case supposed,—namely the photographing of a printed page,—the paper will show with black or dark lettering upon a white surface exactly the same as the printed page. Wherever the image, in other words, was dark, the photograph will be dark, and where the image was light, the photograph will be light.

While I have described a plurality of separate dark chambers,—for example, 11 and 40,—it will be understood that it is not necessary that each of these dark chambers be separated by partitions from each other but only that they be properly separated from the exposure chambers with which they communicate and from the outside light. The claims are of course to be construed accordingly.

What I claim as my invention and desire to secure by Letters Patent is:—

1. The combination with a camera comprising a dark chamber adapted to contain a roll of sensitized fabric, and means for forwarding said fabric from said dark chamber into the exposure chamber of said camera, of a second dark chamber communicating with said camera, a tank in said second dark chamber, means for forwarding said fabric from said exposure chamber into and through said tank and said second dark chamber, a second exposure chamber communicating with said second dark chamber, means for forwarding said fabric from said second dark chamber into and through said second exposure chamber, a third dark chamber communicating with said second exposure chamber, a tank in said third dark chamber, and means for forwarding said fabric from said second exposure chamber into and through said third dark chamber and the tank therein.

2. The combination with a camera comprising a dark chamber adapted to contain a roll of sensitized fabric, means for forwarding said fabric from said dark chamber into the exposure chamber of said camera, and a blade adapted to sever from said roll said piece of exposed fabric, of a second dark chamber communicating with said camera, a tank in said second dark chamber, means for forwarding said exposed sheet from said exposure chamber into and through said tank and said second dark chamber, a second exposure chamber communicating with said second dark chamber, means for forwarding said exposed sheet from said second dark chamber into and through said second exposure chamber, a tank in said third dark chamber, and means for forwarding said exposed sheet from said second exposure chamber into and through said third dark chamber and the tank located therein.

3. The combination with a camera comprising a dark chamber adapted to contain a roll of sensitized fabric, and means for forwarding said fabric from said dark chamber into the exposure chamber of said camera, of a second dark chamber communicating with said camera, a series of tanks in said second dark chamber, means for forwarding said fabric from said exposure chamber into and through said tanks successively and out of said second dark chamber, a second exposure chamber communicating with said second dark chamber, means for forwarding said fabric from said second dark chamber into and through said second exposure chamber, a third dark chamber communicating with said second exposure chamber, a tank in said third dark chamber, and means for forwarding said fabric from said second exposure chamber into and through said third dark chamber and the tank located therein.

FRANK E. OILER.

Witnesses:
C. E. PICKARD,
W. H. DE BUSK.